(12) United States Patent
Robinson et al.

(10) Patent No.: US 7,734,514 B2
(45) Date of Patent: Jun. 8, 2010

(54) PRODUCT VARIETY INFORMATION

(75) Inventors: Andrew Robinson, Apple Valley, MN (US); Bill Adam, Sandy Hook, CT (US)

(73) Assignee: Grocery Shopping Network, Inc., Minneapolis, MN (US)

( * ) Notice: Subject to any disclaimer, the term of this patent is extended or adjusted under 35 U.S.C. 154(b) by 371 days.

(21) Appl. No.: 11/122,785

(22) Filed: May 5, 2005

(65) Prior Publication Data

US 2006/0253344 A1   Nov. 9, 2006

(51) Int. Cl.
G06F 17/30   (2006.01)
(52) U.S. Cl. ............. 705/27; 705/26; 705/14
(58) Field of Classification Search ........... 705/27, 705/26, 14
See application file for complete search history.

(56) References Cited

U.S. PATENT DOCUMENTS

| | | | |
|---|---|---|---|
| 5,250,789 A | 10/1993 | Johnsen | |
| 5,983,200 A | 11/1999 | Slotznick | |
| 6,055,513 A | 4/2000 | Katz et al. | |
| 6,223,094 B1 * | 4/2001 | Muehleck et al. | 700/107 |
| 6,381,583 B1 | 4/2002 | Kenney | |
| 6,587,835 B1 | 7/2003 | Treyz et al. | |
| 6,647,372 B1 | 11/2003 | Brady et al. | |
| 6,851,604 B2 * | 2/2005 | Girotto et al. | 235/378 |
| 6,871,198 B2 * | 3/2005 | Neal et al. | 707/3 |
| 6,898,571 B1 | 5/2005 | Val et al. | |
| 7,013,290 B2 | 3/2006 | Ananian | |
| 7,047,209 B2 | 5/2006 | Filepp et al. | |
| 7,366,721 B1 * | 4/2008 | Bennett et al. | 1/1 |
| 2001/0027418 A1 * | 10/2001 | Johnson | 705/22 |
| 2001/0032122 A1 | 10/2001 | Hankla | |
| 2001/0044758 A1 | 11/2001 | Talib et al. | |
| 2002/0007322 A1 * | 1/2002 | Stromberg | 705/26 |
| 2002/0022995 A1 | 2/2002 | Miller et al. | |
| 2002/0147638 A1 | 10/2002 | Banerjee et al. | |
| 2002/0147639 A1 | 10/2002 | Williams et al. | |
| 2002/0161658 A1 | 10/2002 | Sussman | |
| 2002/0188527 A1 | 12/2002 | Dillard et al. | |
| 2002/0194058 A1 | 12/2002 | Eldering | |
| 2003/0051242 A1 * | 3/2003 | Donnelly | 725/42 |
| 2003/0191688 A1 | 10/2003 | Prince, III et al. | |
| 2004/0039661 A1 | 2/2004 | Fuzell-Casey et al. | |
| 2004/0128198 A1 | 7/2004 | Register et al. | |
| 2004/0254837 A1 | 12/2004 | Roshkoff | |
| 2005/0027598 A1 | 2/2005 | Greiner | |
| 2005/0049914 A1 | 3/2005 | Parish | |
| 2005/0091111 A1 | 4/2005 | Green et al. | |
| 2005/0144072 A1 | 6/2005 | Perkowski | |
| 2005/0159974 A1 * | 7/2005 | Moss et al. | 705/1 |

(Continued)

OTHER PUBLICATIONS

PRN: "Attention Shoppers: Kmart's Weekly Circular Now Available Online," PR Newswire, Nov. 14, 2000, Dialog file 16 #08043549, 3pgs.*

*Primary Examiner*—Robert M. Pond
(74) *Attorney, Agent, or Firm*—IPLM Group, P.A.

(57) ABSTRACT

The present invention provides product available varieties information. In one embodiment, a method of providing information regarding items for sale is provided. The method comprises displaying items for sale on a graphic user interface (GUI). Providing an available varieties link on the GUI for items having different varieties and displaying the available varieties of an associated item when the varieties link has been activated.

20 Claims, 3 Drawing Sheets

U.S. PATENT DOCUMENTS

| | | |
|---|---|---|
| 2005/0177463 A1 | 8/2005 | Crutchfield, Jr. et al. |
| 2005/0189414 A1 | 9/2005 | Fano et al. |
| 2005/0189415 A1 | 9/2005 | Fano et al. |
| 2005/0216339 A1 | 9/2005 | Brazell et al. |
| 2005/0216347 A1 | 9/2005 | Williams et al. |
| 2005/0283401 A1 | 12/2005 | Swix et al. |
| 2006/0020512 A1 | 1/2006 | Lucas et al. |
| 2006/0026067 A1 | 2/2006 | Nicholas et al. |
| 2006/0047573 A1 | 3/2006 | Mitchell et al. |
| 2006/0080173 A1 | 4/2006 | Robinson et al. |

* cited by examiner

PRODUCT VARIETY INFORMATION

TECHNICAL FIELD

The present invention relates generally to the description of products for sale and in particular providing product available varieties information.

BACKGROUND

The ability to obtain information in fast and efficient manner is of great benefit in today's society. It is common to find all adults of a household working outside of the home to make ends meet. This does not leave much time to do the shopping or preparing food for the family. The use of personal computers and the internet has greatly increased the efficiency of modern day life. For example, the internet can be used to conduct research on recipes and can be used even to view store inventories and store specials. Moreover, stores may e-mail periodic circular ads that describe the items they have on sale. Screen displays such as Graphical User Interfaces (GUIs) indicating a store's items can be very helpful for the consumer. However, if a product has different varieties, it can be difficult to determine if a variety of an item desired is available at a store.

For the reasons stated above and for other reasons stated below which will become apparent to those skilled in the art upon reading and understanding the present specification, there is a need in the art for an improved method of providing available variety information.

SUMMARY

The above-mentioned problems and other problems are resolved by the present invention and will be understood by reading and studying the following specification.

In one embodiment, a method of providing information regarding items for sale is provided. The method comprises displaying items for sale on a graphic user interface (GUI). Providing an available varieties link on the GUI for items having different varieties and displaying the available varieties of an associated item when the varieties link has been activated.

In another embodiment, a method of providing variety information of select items for sale is provided. The method comprises displaying a circular ad on a screen of a graphic user interface (GUI), the circular ad including items for sale. Providing available varieties links for items in the circular ad having more than one variety available and displaying available varieties associated with an item upon activation of an associated varieties link.

In still another embodiment, a method of providing product variety information is provided. The method includes displaying an ad of items for sale on a display screen. Providing an item specific screen upon selection of a desired item. Displaying a varieties link associated with the desired item and displaying available varieties of the desired item upon activation of the varieties link.

In yet further another embodiment, a computer-readable medium having computer-executable instructions for performing a method includes displaying items for sale on a graphic user interface (GUI). Providing an available varieties link on the GUI for items having different varieties and displaying the available varieties of an associated item when the varieties link has been activated.

In another embodiment, a grocery information system is provided. The system includes a means for displaying available items for sale on a GUI. A means for providing a varieties link for each item having different available varieties and a means for displaying different available varieties of an item upon activation of an associated varieties link.

BRIEF DESCRIPTION OF THE DRAWINGS

The present invention can be more easily understood and further advantages and uses thereof more readily apparent, when considered in view of the description of the preferred embodiments and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description of the preferred embodiments, reference is made to the accompanying drawings, which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Embodiments of the present invention provide an efficient method of relaying available varieties information of a product or item carried by a retailer to a consumer. In one embodiment, a graphic user interface (GUI) is adapted to display available varieties information via link in an on line shopping circular.

Figure 1:
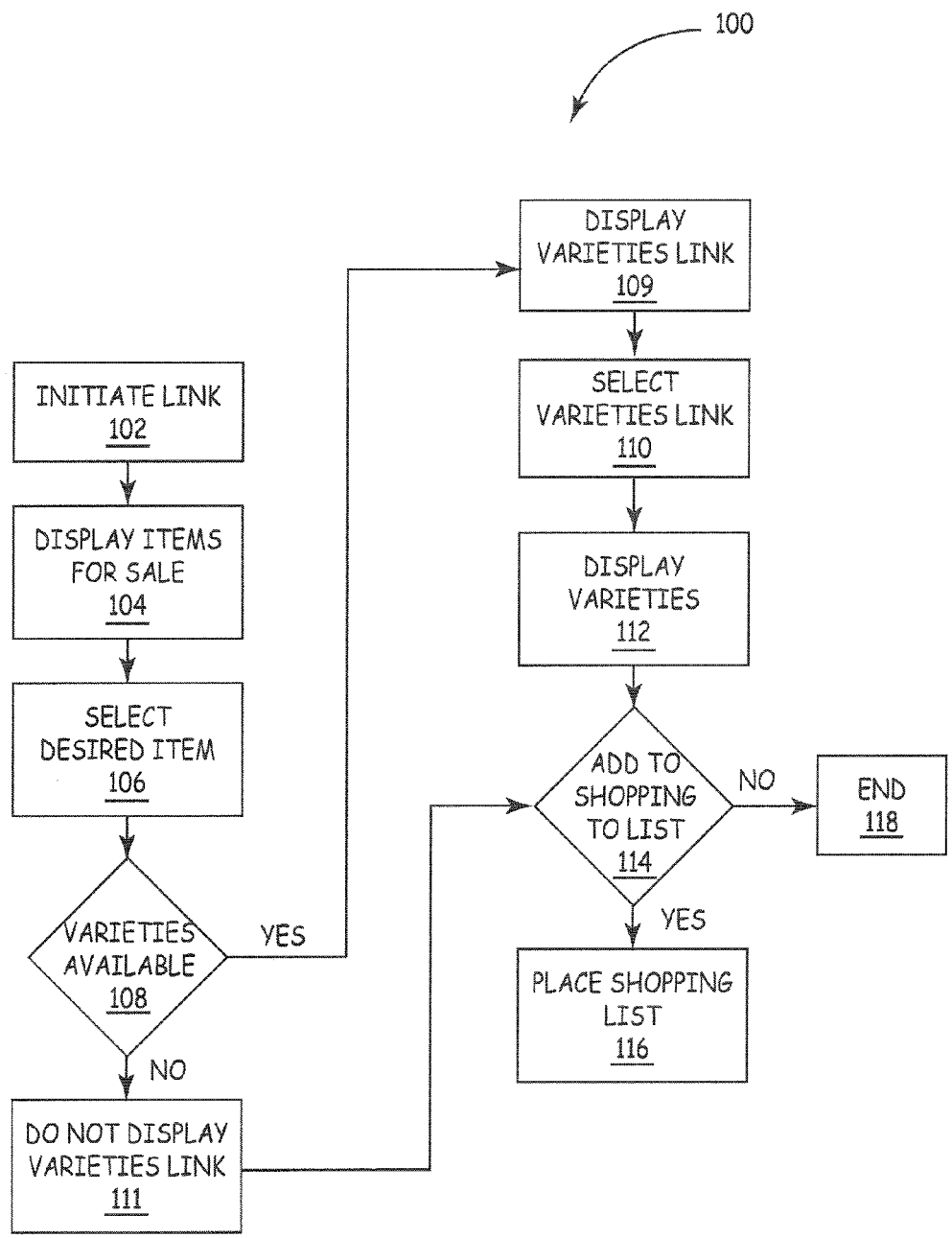
FIG. 1 is a flow diagram of one embodiment of the present invention.

Referring to FIG. 1, a flow diagram 100 of one embodiment of the present invention is illustrated. As illustrated, the flow diagram 100 begins by the user establishing a link to a retailer's inventory (102). This can be done with a computer linked to a database of the retailer over the internet, intranet or another type of communication link. Once the link has been established, the inventory of the retailer is displayed on the consumer's graphic user interface (GUI) or display screen (104). The retailer controls which items in their inventories that they want displayed. For example, a retailer may want to display items that are on sale in a circular ad format that is familiar to consumers. The consumer is then able to select an item or product they are interested in (106). In one embodiment, once a product has been selected, a product specific page is displayed that has more specific information on the product or item. Typically, the item is then selected to be stored in a shopping list for later purchase or for use in compiling a printed shopping list of all selected items. A limitation in the prior art is when the retailer has different varieties of an item for sale. An efficient manner to convey varieties of items that are in stock is desired.

In embodiments of the present invention, it is first determined if varieties of a selected item are available (i.e. in stock) (108). If there are available varieties of an item (108), a link to the available varieties is provided (109). If the link to the select items is activated, a link to the select available varieties is established (110) and the select available varieties are displayed (112). In one embodiment, an option to select one or more of the varieties of the products to be stored in the shopping list is provided (114). If the consumer elects (114), the variety (or varieties) of selected item(s) is placed in the shopping list (116). If the consumer does not elect to add the variety of selected item to the shopping list (114), the process ends (118). If there are no available varieties of an item (111), the consumer is provided the option to add the item to the consumer's shopping list (114). If the consumer exercises this option (114), the item is placed in the shopping list (116). If the consumer declines this option (114), the process ends (118).

Figure 2:
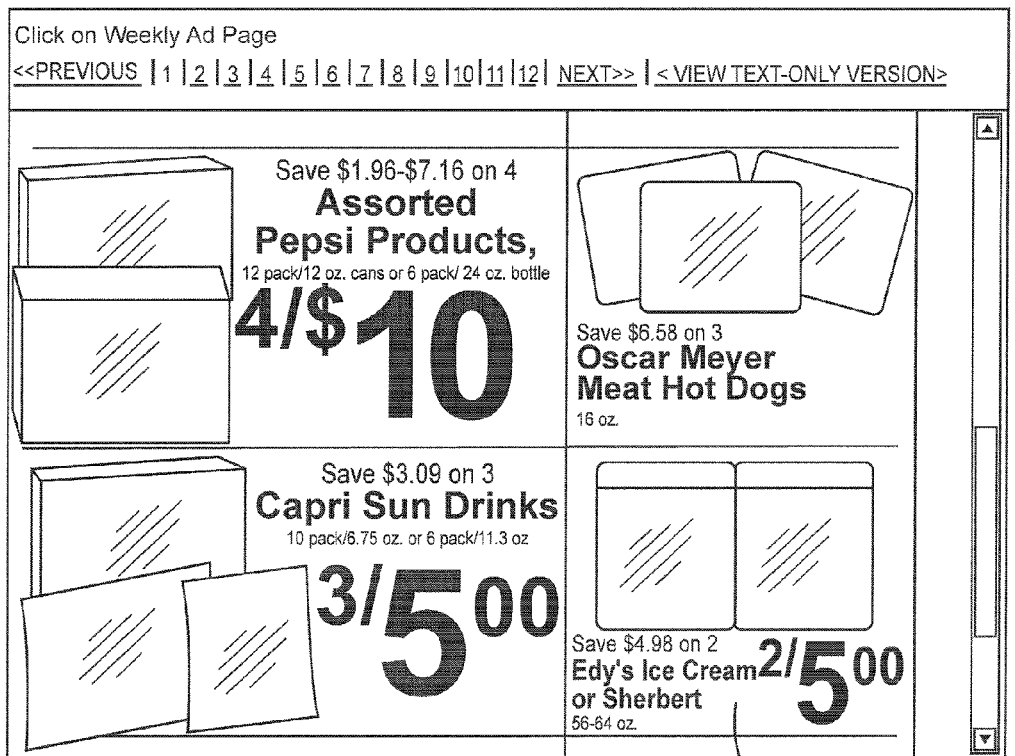
FIG. 2 is a screen shot of a circular ad.
Figure 3:
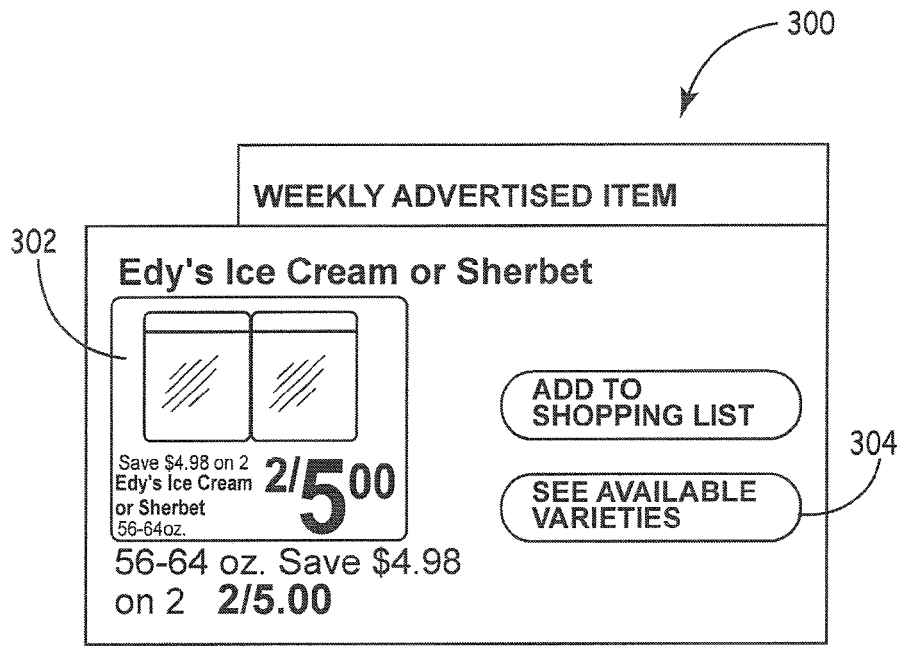
FIG. 3 is a item specific screen shot of one embodiment of the present invention.
Figure 4:
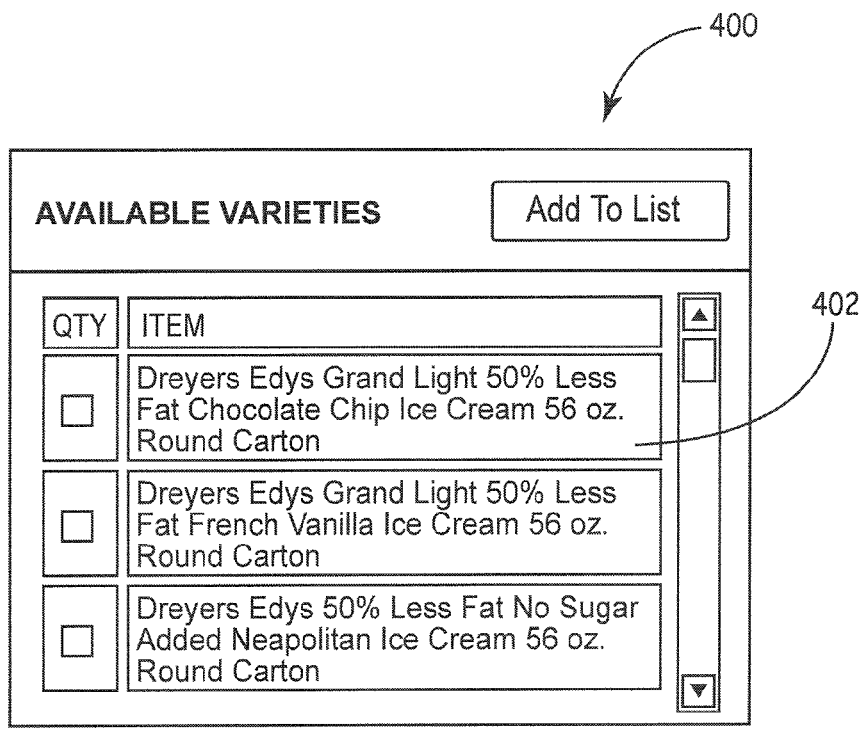
FIG. 4 is an available varieties screen shot of one embodiment of the present invention.

FIG. 2 is an illustration of a screen shot illustrating an ad circular 200. As illustrated, a plurality of items is displayed. The consumer merely selects the item that they desire. For example, the consumer may desire ice cream 202. Once that item is selected a more detailed screen 300 of that product is displayed. As example of this is illustrated in the item specific screen shot 300 of FIG. 3. In embodiments of the present invention, an available varieties link 304 is provided when available varieties are present. In this example, there are different varieties of ice cream available so the available varieties link (304) is provided. When the available varieties link (304) is activated, an available varieties screen 400 is displayed. An available varieties screen shot is illustrated in FIG. 4. As illustrated, a list 400 of available varieties is provided, which in this example are the available varieties of ice cream. The available varieties information provided in this example includes the size per unit, the flavor and the brand name. Moreover, depending on the product, other types of available varieties information may be provided.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory previously or now known or later developed, including by way of example semiconductor memory devices, such as erasable programmable read-only memory (EPROM), electrically erasable programmable read-only memory (EEPROM), and flash memory devices; magnetic disks such as internal hard disks and removable disks; magneto-optical disks; and DVD disks. Any of the foregoing may be supplemented by, or incorporated in, specially-designed application-specific integrated circuits (ASICs).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. For example, although, the above invention is illustrated in relation to grocery items, the same process can be used for other types of products having different varieties. Therefore, it is manifestly intended that this invention be limited only by the claims and the equivalents thereof.

The invention claimed is:

1. A method of providing information regarding items put on sale by a retailer, the method comprising:
   determining items put on sale having different varieties;
   determining the different varieties available in the retailer's inventory for at least one of the items put on sale;
   selectively choosing which of the available different varieties associated with the item are to be put on sale for the same price as the item;
   linking the chosen available different varieties with the associated item with a programmable processor;
   displaying the items put on sale on a graphical user interface;
   providing the available different varieties links on the graphical user interface; and
   activating a different varieties link of an associated item and displaying the chosen available varieties upon selection of the different varieties link.

2. The method of claim 1, wherein the items displayed are in the form of a circular ad.

3. The method of claim 1, further comprising: adding selected varieties to a shopping list.

4. The method of claim 1, further comprising:
   displaying a detailed item screen upon selection of an associated item.

5. The method of claim 1, wherein the information displayed when a varieties link has been activated includes at least one of size per unit, flavor and brand name.

6. The method of claim 1, wherein the chosen available varieties are at least one of different available flavors and different brand names of an item.

7. A method of providing variety information of select items for sale, the method comprising:
   selectively choosing which available different varieties of an item for sale in a retailer's inventory are to be on sale for the same price as the item;
   linking the item to each selectively chosen different available variety that is on sale at the same sale price with a programmable processor;
   displaying a circular ad on a screen of a graphic user interface, the circular ad including items for sale from the retailer's inventory;
   providing available varieties links for each of the items in the circular ad having more than one selectively chosen variety; and
   displaying selectively chosen varieties associated with an item that are available for the same sale price upon activation of an associated varieties link in the circular ad.

8. The method of claim 7, further comprising:
   displaying a detailed description of an item upon activation of an items link.

9. The method of claim 7, further comprising:
providing a shopping list of selected varieties of items.

10. A method of providing product variety information, the method comprising:
selectively choosing different varieties of a product that are to be on sale for the same price as the product;
creating links between the chosen different varieties of the product that are to be on sale for the same price and are in stock with a programmable processor;
displaying an ad of products for sale on a display screen;
providing product specific screen upon selection of a desired product;
displaying a varieties link associated with the desired product; and
displaying the selectively chosen available different varieties of the desired product that are available for a same sale price upon activation of the varieties link.

11. The method of claim 10, further comprising:
adding select varieties to a shopping list.

12. The method of claim 10, wherein information displayed upon activation of varieties link includes at least one of size per unit, flavor and brand name.

13. A computer-readable medium storing computer-executable instructions for performing a method comprising:
creating varieties links between products that have different varieties that are in stock at a store that are selectively chosen by the store to be on sale for a same price as the product with a programmable processor;
displaying items for sale on a graphical user interface;
providing an available varieties link on the graphical user interface for items having different varieties that have been selectively chosen by the store; and
displaying the selectively chosen available varieties of an associated item upon activation of a varieties link, wherein the each different variety of a product that is displayed is available at the select same product sale price.

14. The computer readable medium of claim 13, wherein the items displayed are in the form of a circular ad.

15. The computer readable medium of claim 13, further comprising: adding selected varieties to a shopping list.

16. The computer readable medium of claim 13, further comprising: displaying a detailed item screen upon selection of an associated item.

17. The computer readable medium of claim 13, further comprising:
providing information when the varieties link has been activated including at least one of size per unit, flavor and brand name.

18. A grocery information system, the system comprising:
a means for selectively choosing which varieties of an item that has a plurality of different varieties are to be put on sale for the same sale price as the item;
a means for establishing links between the chosen different available varieties that are in stock at a store;
a means for displaying available items for sale on a graphical user interface:
a means for providing a varieties link for each item having chosen available different varieties; and
a means for displaying the chosen available different varieties of an item that are available for a same select sale price upon activation of an associated varieties link.

19. The system of claim 18, further comprising:
a means for displaying an item specific screen upon selection of the item.

20. The system of claim 18, further comprising:
a means for placing a desired variety of an item in a shopping list.

* * * * *